(12) United States Patent
Fukushima et al.

(10) Patent No.: US 7,579,731 B2
(45) Date of Patent: Aug. 25, 2009

(54) MINIATURE BRUSHLESS MOTOR STRUCTURE

(75) Inventors: Eri Fukushima, Tokyo (JP); Yukiharu Shimizu, Tokyo (JP); Kazuya Nakamura, Tokyo (JP)

(73) Assignee: Namiki Seimitsu Houseki Kabushiki Kaisha (JP)

( * ) Notice: Subject to any disclaimer, the term of this patent is extended or adjusted under 35 U.S.C. 154(b) by 0 days.

(21) Appl. No.: 11/791,519

(22) PCT Filed: Nov. 8, 2005

(86) PCT No.: PCT/JP2005/020441

§ 371 (c)(1), (2), (4) Date: May 24, 2007

(87) PCT Pub. No.: WO2006/059461

PCT Pub. Date: Jun. 8, 2006

(65) Prior Publication Data

US 2007/0267934 A1 Nov. 22, 2007

(30) Foreign Application Priority Data

Nov. 30, 2004 (JP) ............................. 2004-347868

(51) Int. Cl.
*H02K 3/50* (2006.01)
*H02K 29/00* (2006.01)
*H02K 5/22* (2006.01)

(52) U.S. Cl. .................... 310/71; 310/40 MM; 310/89; 310/141; 310/142; 310/43; 310/67 R (58) Field of Classification Search ................ 310/141, 310/142, 71, 89, 40 MM; *H02K 3/50, 5/22, H02K 29/00*
See application file for complete search history.

(56) References Cited

U.S. PATENT DOCUMENTS

| 2,874,470 | A | * | 2/1959 | Richards ..................... 433/85 |
| 4,665,331 | A | * | 5/1987 | Sudo et al. ................ 310/68 R |
| 5,240,003 | A | * | 8/1993 | Lancee et al. ............... 600/467 |

(Continued)

FOREIGN PATENT DOCUMENTS

JP 61-094529 5/1986

(Continued)

OTHER PUBLICATIONS

JP 2000/166157EN.pdf : Nakamura et al (JP 2000/166157, IDS, English translation) (translation date: Jan. 8, 2009).*

*Primary Examiner*—Quyen Leung
*Assistant Examiner*—John K Kim
(74) *Attorney, Agent, or Firm*—Studebaker & Brackett PC; Donald R. Studebaker (57) ABSTRACT

Disclosed herein is a reliable inner rotor type miniature brushless motor structure wherein, while a field coil is fixedly disposed onto the inner wall of a housing, an end flange is fixedly disposed into one end of the housing from where tap wires of the field coil are drawn out, so that the tap wires exposed from the end-flange side end of the housing can be connected to wiring substrates fixedly disposed onto the outer periphery of the end flange without the need to bend the wiring substrates, and further so that power feed lands can be large enough to reduce the likelihood of wiring breakage and other problems.

17 Claims, 8 Drawing Sheets

U.S. PATENT DOCUMENTS

| | | | |
|---|---|---|---|
| 5,442,248 A * | 8/1995 | Agnoff | 310/71 |
| 5,481,144 A * | 1/1996 | Dunfield et al. | 310/71 |
| 5,600,193 A * | 2/1997 | Matsushima et al. | 310/68 C |
| 5,677,579 A * | 10/1997 | Dona et al. | 310/40 MM |
| 5,874,795 A * | 2/1999 | Sakamoto | 310/156.12 |
| 5,986,367 A * | 11/1999 | Tsuzaki et al. | 310/71 |
| 6,888,271 B2 * | 5/2005 | York | 310/49 A |
| 2002/0171301 A1 * | 11/2002 | Neri | 310/68 R |
| 2003/0067226 A1 * | 4/2003 | Matsushita et al. | 310/40 MM |

FOREIGN PATENT DOCUMENTS

| | | |
|---|---|---|
| JP | 10-098846 | 4/1998 |
| JP | 10-229660 | 8/1998 |
| JP | 2000-166157 | 6/2000 |
| JP | 2001-016815 | 1/2001 |
| WO | WO 03/079520 A1 | 9/2003 |

* cited by examiner

MINIATURE BRUSHLESS MOTOR STRUCTURE

BACKGROUND OF THE INVENTION

1. Field of the Invention

The present invention relates to a miniature brushless motor used in, for example, micro machinery and precision medical equipment.

2. Description of Related Art

Conventional small cylindrical motors with an outer diameter of approximately 5 mm have been used as eccentrically weighted vibrating motors built in mobile communication devices, such as pagers, personal handy phone systems, and mobile phones, or as drive motors mounted in multi-motored precision equipment, such as office automation equipment, optical instruments, and radio-controlled model vehicles. Moreover, demands for minimized diameter and length are intensifying year by year due to the increasing demand in recent years for ultra-small motors primarily intended to be mounted in precision medical equipment, such as endoscopes or high-tech industrial equipment.

However, the smaller a motor, the more mechanically difficult it is to route the wiring, such as power feed wires, from the power supply side. For ultra-small diameter motors, in particular with an outer diameter of 3 mm or smaller, it is critically important to optimize power feed wiring structure and the mounting location of each part in motor diameter reduction.

Figure 6:
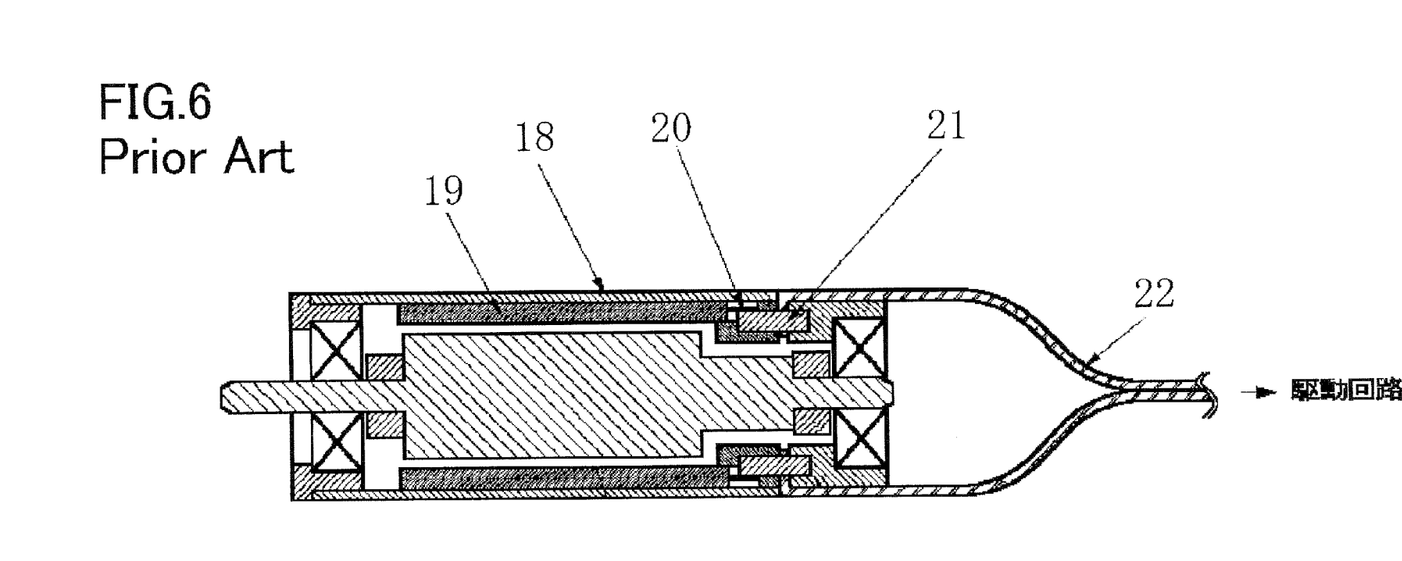
FIG. 6 shows a cross-sectional view of a conventional miniature motor.
Figure 7:
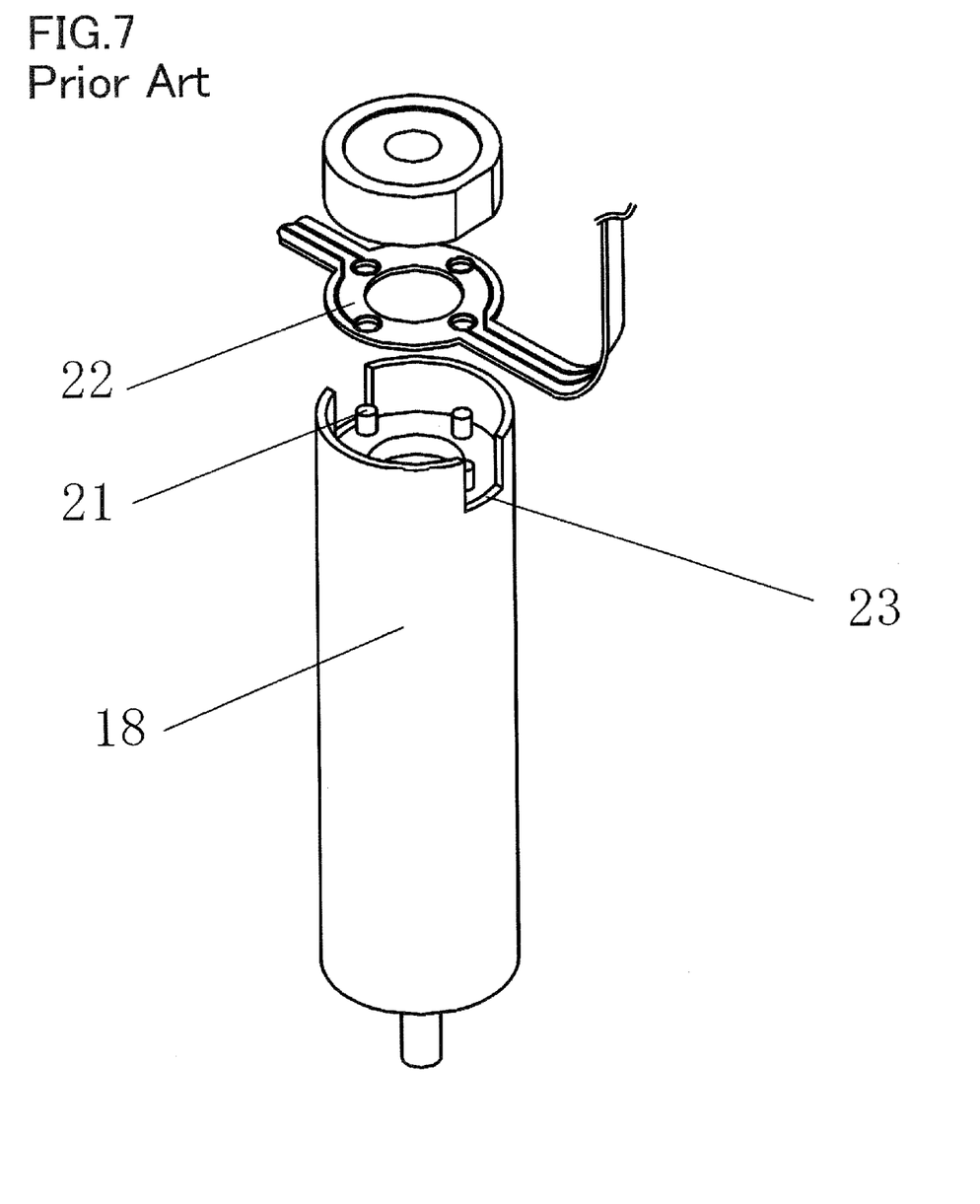
FIG. 7 shows an assembling perspective view of a power feeding portion for connection terminals of the conventional miniature motor.

FIGS. 6 and 7 show a motor wherein field coil tap wires 20 of a cup-shaped or bell-shaped multiphase field coil 19 are connected to power feed lands of a flexible substrate 22 via connection terminals 21. The strip-shaped protrusions of the flexible substrate 22 extending in the outer radial direction are bent to be accommodated in the concave portions of cutouts 23 provided on one outer peripheral end of a housing 18. Thus, elimination of any protrusion in the outer radial direction of the housing allows diameter minimization. The resulting advantages are significant especially for motors with an outer diameter of 2 mm or smaller (See Reference 1).

Figure 8:
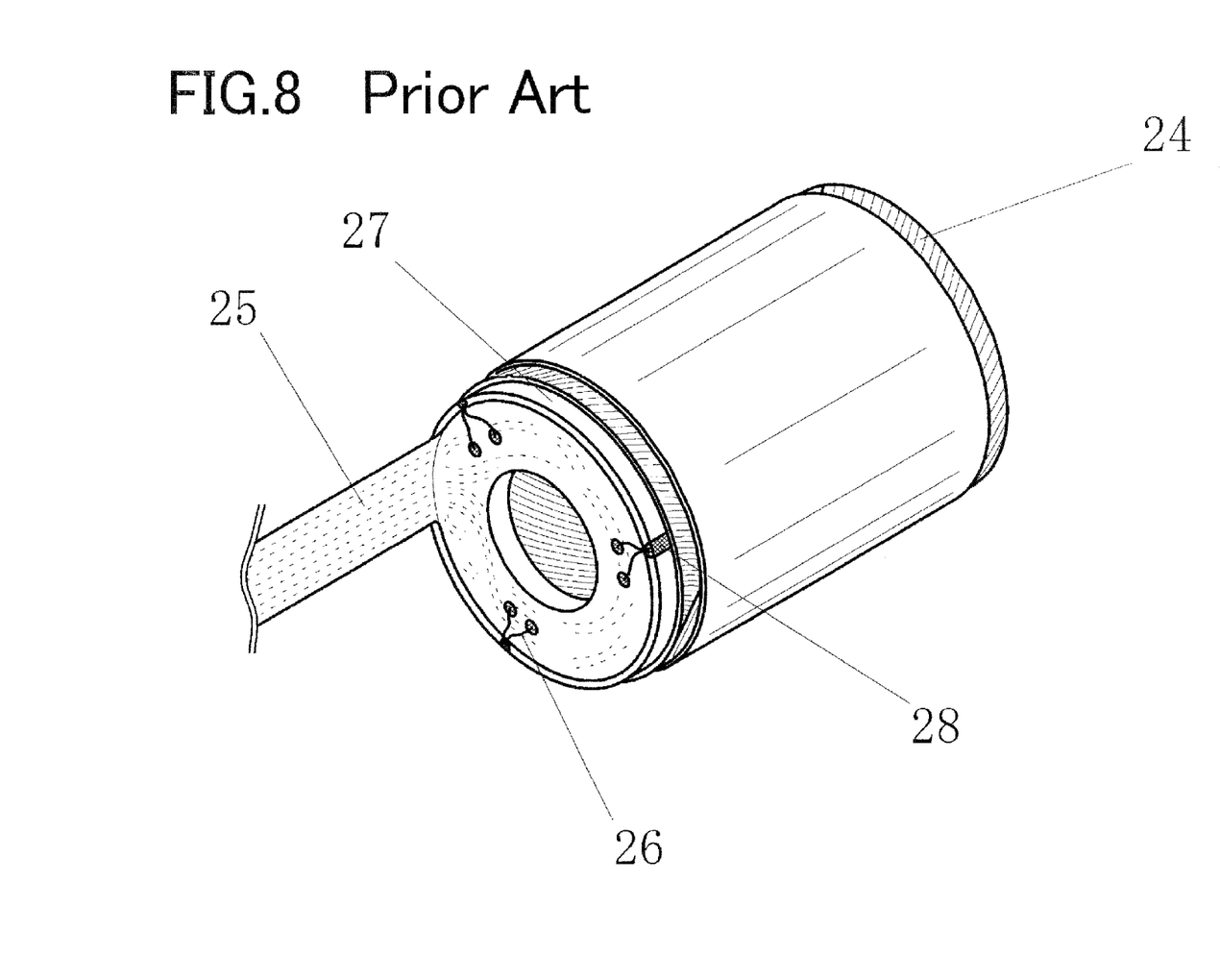
FIG. 8 shows a schematic perspective view of a stator including a field coil of another conventional miniature motor.

As illustrated in FIG. 8, an approximate annular-shaped mounting substrate 27 for holding a flexible substrate 25 having power feed lands for connecting field coil tap wires 26 to an external power supply is fixedly disposed onto one end of a field coil 24, while concave grooves 28 are provided on the outer periphery of the mounting substrate 27 to adhesively hold the field coil tap wires 26. Thus, the mounting substrate 27 doubles as a holder for the field coil tap wires 26 and as a connection relay point to the flexible substrate 25, thereby reducing the likelihood of wire breakage, facilitating connection work to the external power supply, and improving assembly efficiency (See Reference 2).

Reference 1: Japanese Patent Publication No. 2000-166157
Reference 2: Japanese Patent Publication No. 2003-284278

DISCLOSURE OF THE INVENTION

Problems Solved by the Invention

Unfortunately, however, the related art described in the above-noted patent documents requires that a flexible substrate be bent and formed into a power feed route. Consequently, the likelihood of wire breakage at the bend is high. Moreover, the curvature (corner curvature) of the bend often results in variations of assembly precision, and therefore it was necessary to design the parts having such curvatures by taking the clearance between the parts into consideration. All these drawbacks are disadvantageous in reducing the size of motors.

In a conventional flexible substrate, power feed lands are arranged in the cross-sectional direction of the motor for connection to the tap wires. Hence, a smaller-diameter motor has a reduced radial cross-sectional area and thereby smaller power feed lands, making assembly and other work more difficult. Smaller power feed lands also result in a proportionally reduced amount of soldering for wiring connections and a reduction in the fixation strength of tap wires, and hence a reduced reliability of the motor.

Therefore, the object of the present invention is to provide a reliable miniature motor structure that solves the above-noted drawbacks, helps to secure sufficiently large power feed lands, and thereby allows for size reduction without the need to bend the flexible substrate.

SUMMARY OF THE INVENTION

A first aspect of the present invention provides an inner rotor type miniature brushless motor comprising a housing, a field coil fixedly disposed onto an inner wall of the housing, an end flange fixedly disposed into one end of said housing, of which one end has tap wires of said field coil drawn out therefrom, cutouts provided on the one end of the housing fitted with the end flange providing a means for exposing the wires, and wiring substrates fixedly disposed onto an outer periphery of the end flange and connected to the tap wires.

A second aspect of the present invention provides an inner rotor type miniature brushless motor comprising a housing, a field coil fixedly disposed onto an inner wall of the housing, an end flange fixedly disposed into one end of the housing having tap wires of the field coil drawn out and exposed therefrom, flat faces provided on an outer periphery of the end flange, and wiring substrates fixedly disposed onto the flat faces and connected to the tap wires.

A third aspect of the present invention provides inner rotor type miniature brushless motor comprising a housing, a field coil fixedly disposed onto an inner wall of the housing, an end flange fixedly disposed into one end of the housing having tap wires of the field coil drawn out therefrom, cutouts provided on the one end of the housing fitted with the end flange providing a means for exposing the wires, flat faces provided on an outer periphery of the end flange, and wiring substrates fixedly disposed onto the flat faces and connected to the tap wires.

A fourth aspect of the present invention preferably provides a miniature brushless motor according to any one of the first through third aspects, wherein an approximate annular-shaped tap wire guide made of an electrical insulation material is provided on one side of the field coil from where the tap wires are drawn out.

A fifth aspect of the present invention preferably provides a miniature brushless motor according to the fourth aspect, wherein a raised step is provided on one side of the tap wire guide.

A sixth aspect of the present invention preferably provides a miniature brushless motor according to the fifth aspect, wherein at least one groove is provided on an outer periphery of the tap wire guide.

A seventh aspect of the present invention preferably provides a miniature brushless motor according to any one of the first through sixth aspects, wherein, of the tap wires of the field coil, neutral-point wires are entwined together for star-connection of the field coil to the wiring substrates.

An eighth aspect of the present invention preferably provides a miniature brushless motor according to any one of the first through seventh aspects, wherein the end flange has an outer diameter not greater than that of the housing.

A ninth aspect of the present invention preferably provides a miniature brushless motor according to any one of the first through eighth aspects, wherein a flange is fixedly disposed into the other end of the housing having the one end fixedly fitted with the end flange so that the end flange and/or the flange will double as a bearing.

EFFECTS OF THE INVENTION

In a miniature brushless motor according to any one of the first through third aspects of the present invention, field coil tap wires are exposed through cutouts in a housing or an end-flange side end of a housing and connected to wiring substrates provided onto an outer periphery of an end flange so that, despite motor diameter reduction, the wiring substrates will retain power feed lands sufficiently large enough to accommodate a sufficient amount of solder for secure wiring connections without the need to reduce the amount of solder. Accordingly, problems, such as wire breakage from the reduced fixation strength of the tap wires to the power feed lands are prevented, thereby ensuring improved reliability of the motor.

In a miniature brushless motor using a flexible substrate as a wiring substrate, the flexible substrate need not be bent and therefore can preclude the likelihood of wire breakage at the bend. Furthermore, because it is not necessary to design parts with curvatures and hence no variations in the precision of assembly due to the curvatures will result, it is possible to reduce clearances in between other parts, thereby allowing further size reduction of the motor.

As set forth in the second and third aspects of the present invention, an end flange has an outer periphery provided with flat faces that allow a fixed disposition of wiring substrates in close contact with the end flange and thereby save the need to bend the wiring substrates around curved surface portions. Consequently, not only can detachment of the wiring substrates from the curved surface portions due to the bending stresses that may occur when the wiring substrates are bent, but also a decrease in fixation strength of a hard-to-bend substrate fixed on each curved surface portion due to a small contact area thereof be prevented, thereby ensuring improved reliability of the motor.

In a miniature brushless motor according to the fourth aspect of the present invention, a field coil may have a tap wire side mounted with a tap wire guide that facilitates tap wire routing and hence improves assembly efficiency. Further, tap wires may be glued or otherwise fastened to the tap wire guide to strengthen and protect tap wire draw-out portions from likely wire breakage, thereby ensuring improved reliability of the motor.

In a miniature brushless motor according to the fifth aspect of the present invention, a tap wire guide may be provided with a raised step for securing a space for tap wire routing. Further, the space may be filled with glue or some other adhesive to fasten the tap wire guide and the tap wires and thereby protect the tap wires from direct mechanical loads and prevent wire breakage, hence ensuring improved reliability of the motor. Furthermore, the raised step may prevent the tap wires from entering the inner diametrical portion of the tap wire guide and the extended portion thereof, and hence may prevent interferences between the tap wires and other parts.

Moreover, as set forth in the sixth aspect of the present invention, a tap guide may be provided with grooves for accommodating tap wires. Furthermore, the grooves may be filled with glue or some other adhesive to fasten the tap wires and thereby prevent tap wire breakage, hence ensuring improved reliability of the motor.

In a miniature brushless motor according to the seventh aspect of the present invention, neutral-point wires may be entwined and soldered or otherwise fastened to power feed lands on a wiring substrate for star-connection. Accordingly, such a miniature brushless motor may have fewer and larger power feed lands than miniature brushless motors of which tap wires are connected individually to power feed lands on a wiring substrate. In addition, a fewer number of connections may be required, thereby ensuring an improved assembling work efficiency.

Moreover, in a miniature brushless motor according to the eighth aspect of the present invention, an end flange preferably has an outer diameter no greater than the outer diameter of a housing, thereby allowing minimization of the outer diameter of the miniature brushless motor.

Furthermore, in a miniature brushless motor according to the ninth aspect of the present invention, a housing may have one end fixedly fitted with an end flange and the other end fixedly fitted with a flange so that the end flange and/or the flange will double as a bearing, allowing reduction of the number of intervening parts in radial directions and hence further size reduction.

DESCRIPTION OF THE PREFERRED EMBODIMENTS

Figure 1:
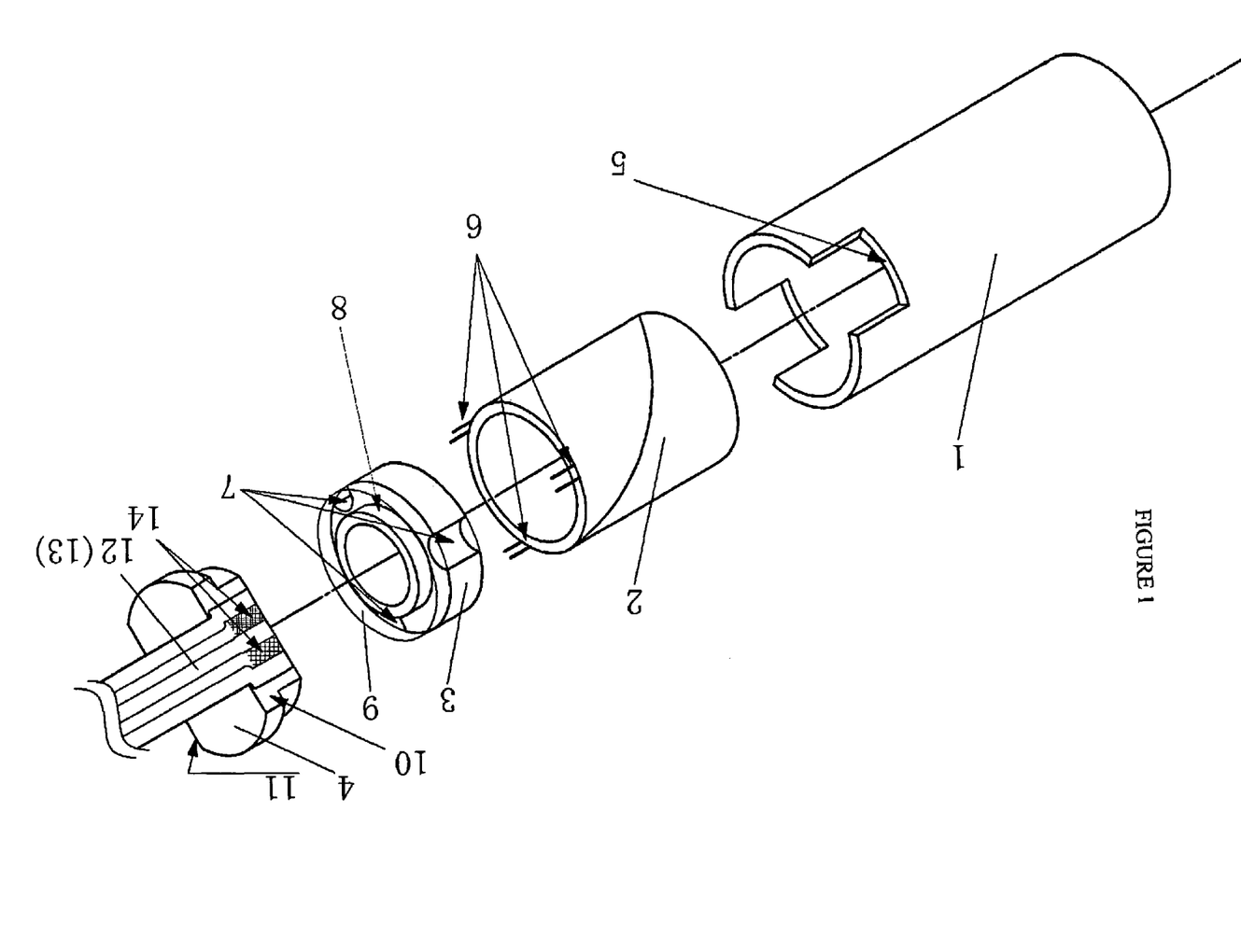
FIG. 1 shows an exploded perspective view of a stator structure of a miniature brushless motor according to a first embodiment of the present invention.

FIG. 1 is an exploded perspective view of a preferred embodiment of the stator structure of a small three-phase brushless motor (hereafter miniature motor) in accordance with the present invention. This stator structure comprises a housing 1, a field coil 2, a tap wire guide 3, an end flange 4, and flexible substrates 12 and 13. The housing 1 has one end provided with cutouts 5. The field coil 2 includes tap wires 6. The tap wire guide 3 is provided with three grooves 7 and a raised step 8. It should be noted that the end flange 4 is shaped to double as a bearing and has an outer periphery provided with flat faces 10 and 11 whereon the flexible substrates 12 and 13 are respectively disposed fixedly in an identical structure.

Figure 5:
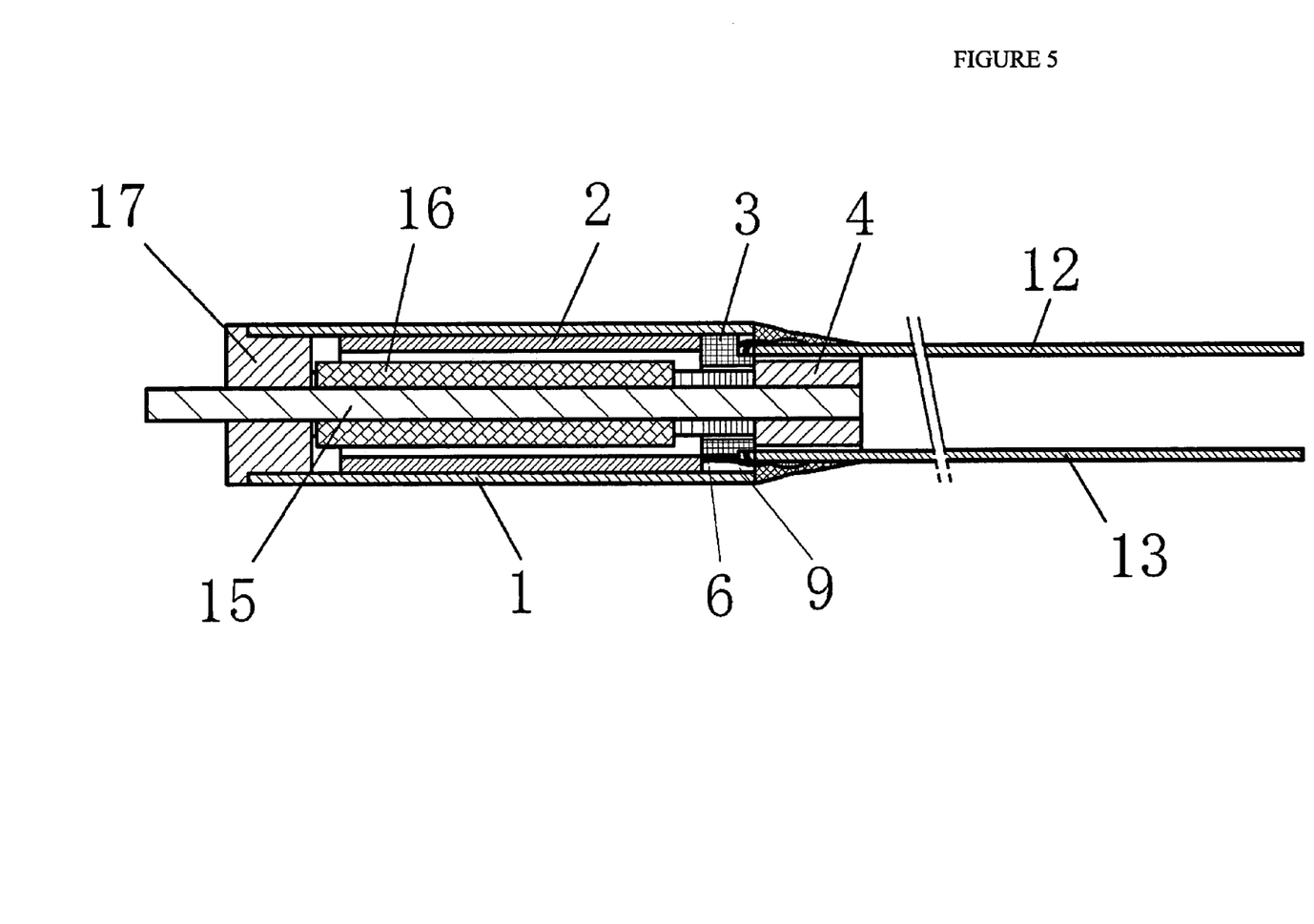
FIG. 5 shows a cross-sectional view of a miniature brushless motor according to the present invention.

As illustrated in FIG. 5, the field coil 2 is fixedly disposed onto the inner wall of the housing 1, while the tap wire guide 3 is disposed onto one end of the field coil 2 from where the tap wires 6 are drawn out. Moreover, a rotor comprising a magnet 16 and a shaft 15 penetrating a center thereof is fixedly disposed into the field coil 2 with a magnetic gap between and is held rotatably with a flange 17 and the end flange 4, which are fixedly disposed into the ends of the housing 1 and jointly double as a bearing. Furthermore, the flexible substrates 12 and 13, respectively, disposed onto the flat faces 10 and 11 of the end flange 4 are connected to the tap wires 6 exposed through the cutouts 5 via grooves 7 provided on the tap wire guide 3 and the space created by the raised step 8 so that a miniature motor in accordance with this invention will allow wiring connections on its outer periphery.

This embodiment of a miniature motor has a star-connection of six tap wires, of which three neutral-point tap wires are entwined together by the guidance of the raised step 8, exposed through the cutouts 5 in the same manner as the other three tap wires, and solder-connected to power feed lands 14 on the two flexible substrates 12 and 13 disposed, respectively, onto the flat faces 10 and 11 of the end flange 4.

Such a structure ensures that the power feed lands 14 have sufficiently large areas despite a decrease in the radial cross-sectional area of the motor due to the reduction in the diameter and allows minimization of the decrease in the amount of soldering for wiring connections and hence reduces the likelihood of problems such as wire breakage resulting from a reduced fixation strength of tap wires to the power feed lands. Moreover, such a structure does not involve bending of the flexible substrates 12 and 13, and therefore prevents the likelihood of wire breakage at the bend and saves the need of making allowance for the radius of the bend.

Moreover, the grooves 7 and the space created by the raised step 8 are filled with glue 9 or some other adhesive, and the solder-connection points connecting the tap wires 6 to the power feed lands 14 of the flexible substrates 12 and 13 are also fastened with the glue 9 or some other adhesive to protect the tap wires and the connection points from direct mechanical overloads and prevent wire breakage, thus ensuring an increased fixation strength of the wiring.

Figure 2:
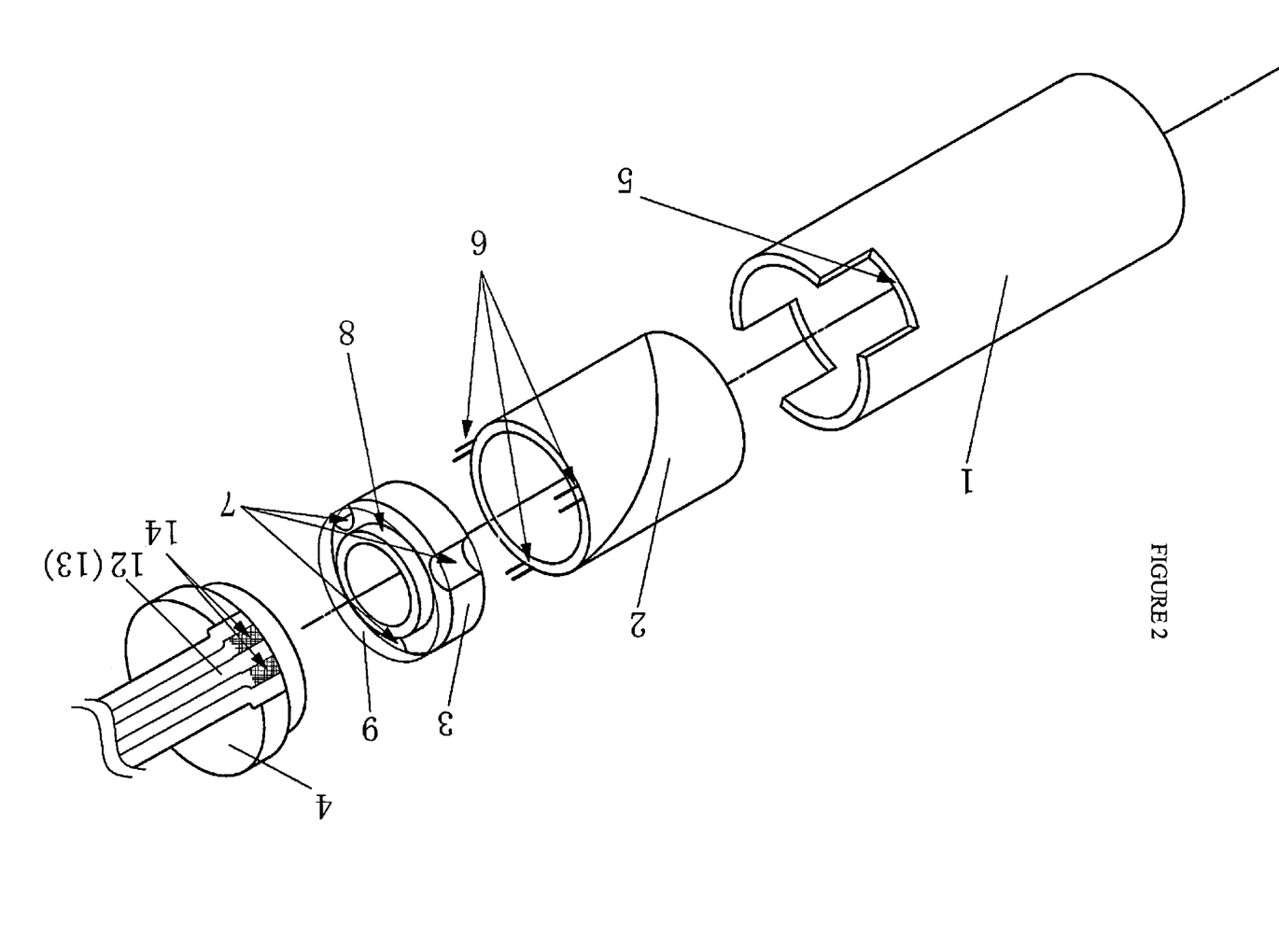
FIG. 2 shows an exploded perspective view of an alternative stator structure of a miniature brushless motor according to another embodiment of the present invention.
Figure 3:
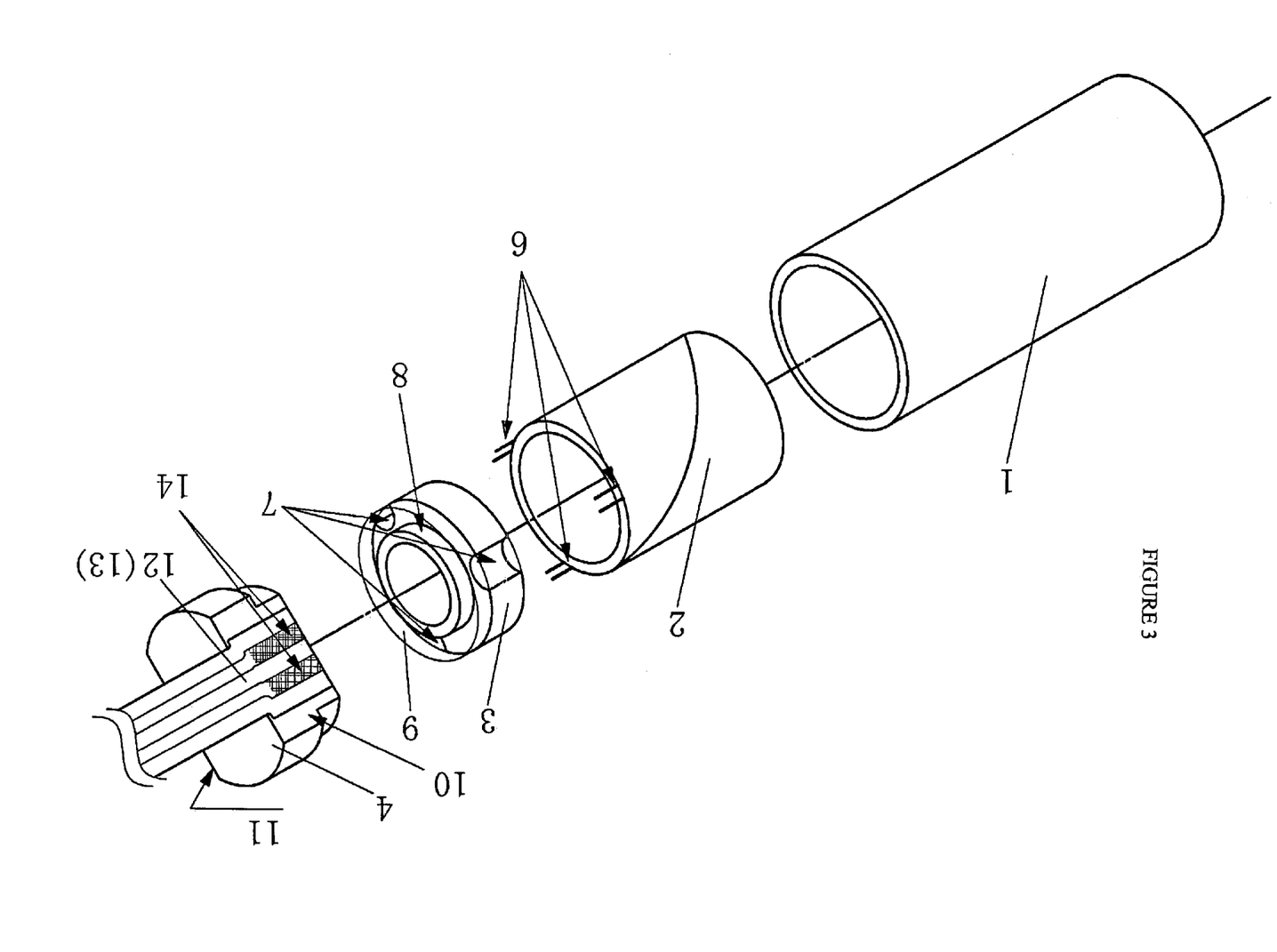
FIG. 3 shows an exploded perspective view of another alternative stator structure of a miniature brushless motor according to yet another embodiment of the present invention.
Figure 4:
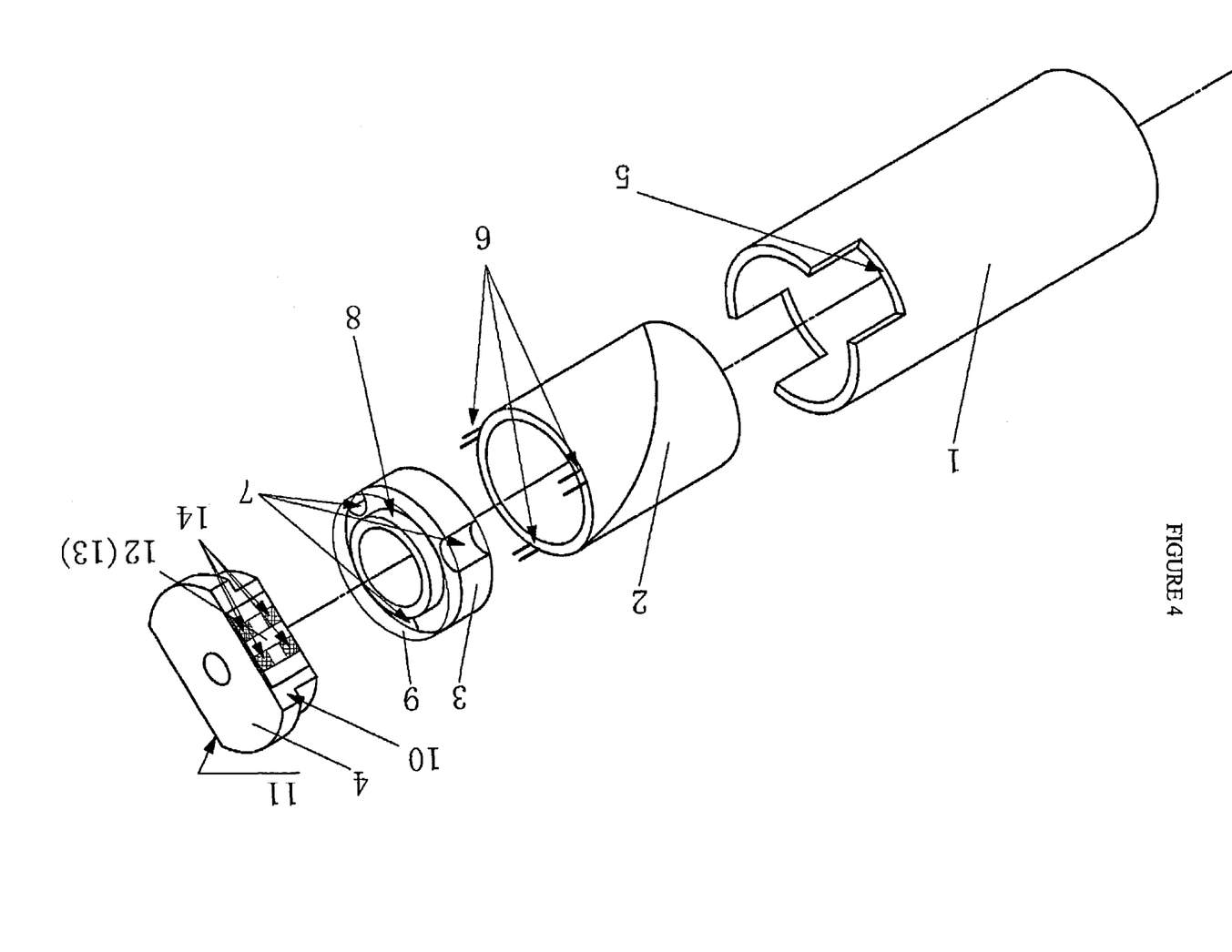
FIG. 4 shows an exploded perspective view of yet another alternative stator structure of a miniature brushless motor according to a further alternative embodiment of the present invention.

While the above-described embodiment is one of the most preferable embodiments for the present invention, alternative stator structures in additional embodiments are shown in FIGS. 2, 3, and 4. FIGS. 2 and 3 illustrate an embodiment of a stator structure that includes either only cutouts 5 provided on one end of a housing 1 or only flat faces 10 provided on the outer periphery of an end flange 4 to allow the connection of exposed tap wires to flexible substrates. Meanwhile, FIG. 4 shows another embodiment of a stator structure wherein, while tap wires are connected to power feed lands 14a provided on flexible substrates 12 and 13 fixedly disposed onto flat faces 10 and 11 of an end flange 4, lead wires from the power supply side are connected to power feed lands 14b provided on the flexible substrates 12 and 13. Thus, lead wires can be used for connections to the power supply side. The present invention includes alternative embodiments of the miniature motor having the stator structures illustrated in FIGS. 2, 3, and 4.

DESCRIPTION OF THE ITEM NUMBERS 1, and 18 Housing
2, 19, and 24 Field coil
3 Tap wire guide
4 End flange
5 and 23 Cutout
6 Tap wire
7 Groove
8 Raised step
9 Glue
10 and 11 Flat face
14, 14a, and 14b Power feed land
12, 13, 22, and 25 Flexible substrate
15 Shaft
16 Magnet
17 Flange
20 and 26 Field coil tap wire
21 Connection terminal
27 Mounting substrate
28 Concave groove

What is claimed is:

1. An inner rotor type miniature brushless motor comprising:
a housing having an outer diameter of 3 mm or less,
a field coil fixedly disposed onto an inner wall of said housing,
an end flange fixedly disposed into one end of said housing, said end flange includes an outer periphery,
a power feed land disposed on the outer periphery of said end flange,
tap wires of said field coil drawn from cutouts provided on said one end of said housing fitted with said end flange and configured to expose said tap wires, and
wiring substrates fixedly disposed onto said outer periphery of said end flange, wherein the tap wires are connected to said wiring substrates at said power feed land.

2. An inner rotor type miniature brushless motor comprising:
a housing having an outer diameter of 3 mm or less,
a field coil fixedly disposed onto an inner wall of said housing,
an end flange fixedly disposed into one end of said housing having tap wires of said field coil drawn out and exposed therefrom, said end flange includes an outer periphery,
flat faces provided on said outer periphery of said end flange,
a power feed land disposed on each of the flat faces of said end flange, and
wiring substrates fixedly disposed onto said flat faces and connected to said tap wires at said power feed land.

3. An inner rotor type miniature brushless motor comprising:
a housing having an outer diameter of 3 mm or less,
a field coil fixedly disposed onto an inner wall of said housing,
an end flange fixedly disposed into one end of said housing, said end flange includes an outer periphery,
tap wires of said field coil drawn from cutouts provided on said one end of said housing fitted with said end flange and configured to expose said tap wires,
flat faces provided on said outer periphery of said end flange, a power feed land disposed on each of the flat faces of said end flange, and wiring substrates fixedly disposed onto said flat faces and connected to said tap wires at said power feed land.

4. A miniature brushless motor according to claim 1, wherein an approximate annular-shaped tap wire guide made of an electrical insulation material is provided on one side of said field coil from where said tap wires are drawn out.

5. A miniature brushless motor according to claim 4, wherein a raised step is provided on one side of said tap wire guide.

6. A miniature brushless motor according to claim 5, wherein at least one groove is provided on an outer periphery of said tap wire guide.

7. A miniature brushless motor according to claim 1, wherein, of said tap wires of said field coil, neutral-point wires are entwined together for star-connection of said field coil to said wiring substrates.

8. A miniature brushless motor according to claim 1, wherein said end flange has an outer diameter not greater than that of said housing.

9. A miniature brushless motor according to claim 1, wherein a flange is fixedly disposed into the other end of said housing having said one end fixedly fitted with said end flange so that said end flange and/or said flange will double as a bearing.

10. A miniature brushless motor according to claim 2, wherein an approximate annular-shaped tap wire guide made of an electrical insulation material is provided on one side of said field coil from where said tap wires are drawn out.

11. A miniature brushless motor according to claim 3, wherein an approximate annular-shaped tap wire guide made of an electrical insulation material is provided on one side of said field coil from where said tap wires are drawn out.

12. A miniature brushless motor according to claim 2, wherein, of said tap wires of said field coil, neutral-point wires are entwined together for star-connection of said field coil to said wiring substrates.

13. A miniature brushless motor according to claim 3, wherein, of said tap wires of said field coil, neutral-point wires are entwined together for star-connection of said field coil to said wiring substrates.

14. A miniature brushless motor according to claim 2, wherein said end flange has an outer diameter not greater than that of said housing.

15. A miniature brushless motor according to claim 3, wherein said end flange has an outer diameter not greater than that of said housing.

16. A miniature brushless motor according to claim 2, wherein a flange is fixedly disposed into the other end of said housing having said one end fixedly fitted with said end flange so that said end flange and/or said flange will double as a bearing.

17. A miniature brushless motor according to claim 3, wherein a flange is fixedly disposed into the other end of said housing having said one end fixedly fitted with said end flange so that said end flange and/or said flange will double as a bearing.

* * * * *